United States Patent
Cooke

(10) Patent No.: US 6,172,134 B1
(45) Date of Patent: *Jan. 9, 2001

(54) ANAEROBICALLY CURABLE COMPOSITION

(75) Inventor: Bernard Cooke, Northants (GB)

(73) Assignee: British Gas PLC, London (GB)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/663,189

(22) PCT Filed: Oct. 13, 1995

(86) PCT No.: PCT/GB95/02429

§ 371 Date: Dec. 11, 1996

§ 102(e) Date: Dec. 11, 1996

(87) PCT Pub. No.: WO96/11991

PCT Pub. Date: Apr. 25, 1996

(30) Foreign Application Priority Data

Oct. 15, 1994 (GB) .................................................. 9420743

(51) Int. Cl.[7] .................................. C09J 4/02; C08J 9/32; C08K 3/36
(52) U.S. Cl. ........................ 523/176; 523/209; 523/212; 523/218; 524/492; 524/493; 526/320
(58) Field of Search .................................... 523/176, 218, 523/219, 209, 212; 526/320; 524/492, 493

(56) References Cited

U.S. PATENT DOCUMENTS

| | | | |
|---|---|---|---|
| 4,293,665 | * 10/1981 | Zalucha et al. | 523/176 |
| 4,309,334 | * 1/1982 | Valitsky | 523/219 |
| 4,340,532 | * 7/1982 | Lee, Jr. et al. | 523/219 |
| 4,477,607 | * 10/1984 | Litke | 523/212 |
| 4,540,738 | * 9/1985 | Zimmermann | 523/176 |
| 4,591,618 | 5/1986 | Naito et al. | 525/279 |
| 4,593,722 | * 6/1986 | Yamamoto et al. | 138/45 |
| 4,629,755 | 12/1986 | Kanaoka | 524/415 |
| 4,713,405 | * 12/1987 | Koga et al. | 523/212 |
| 4,845,151 | * 7/1989 | Sivy | 523/176 |
| 4,929,660 | * 5/1990 | Chen | 523/176 |
| 5,068,265 | * 11/1991 | Casey et al. | 523/176 |
| 5,373,035 | * 12/1994 | Vemura et al. | 523/176 |
| 5,431,831 | 7/1995 | Vincent | 252/29 |

FOREIGN PATENT DOCUMENTS

| | | |
|---|---|---|
| 0114116 | 7/1984 | (EP) . |
| 114117 | * 7/1984 | (EP) . |
| 330115 | * 8/1989 | (EP) . |
| 0352143 | 1/1990 | (EP) . |
| 619347 | * 4/1993 | (EP) . |
| 627475 | * 5/1994 | (EP) . |
| 1362407 | 8/1974 | (GB) . |
| 2195416 | * 7/1988 | (GB) . |
| 2226865 | 7/1990 | (GB) . |
| 2279354 | * 4/1995 | (GB) . |
| 2283491 | 5/1995 | (GB) . |
| 2283875 | 5/1995 | (GB) . |
| 168679 | * 7/1986 | (JP) ..... 523/176 |
| 108283 | * 4/1989 | (JP) ..... 523/218 |
| 168425 | * 4/1989 | (JP) . |
| 158676 | * 6/1990 | (JP) ..... 523/219 |
| 67473 | * 5/1991 | (WO) . |

OTHER PUBLICATIONS

JPO & JAPIO Abstract No: 0474187 & JP07033987A (Three Bond Co Ltd) Feb. 3, 1995.
WPI Abstract Accession No: 94–115696/14 & JP6066308A (Tokyo Three Bond Co Ltd) Mar. 8, 1994.
WPI Abstract Accession No: 94–072152/09 & JP6025612A (Matsushita) Feb. 1, 1994.
WPI Abstract Accession No: 94–072151/09 & JP6025611A (Matsushita) Feb. 1, 1994.

\* cited by examiner

Primary Examiner—Peter A. Szekely
(74) Attorney, Agent, or Firm—William H. Holt

(57) ABSTRACT

An anaerobically curable composition for use in sealing gas pipeline leaks, comprising an anaerobically curable base preparation and a filler, wherein the filler is a metal-containing filler having a substantially metal free barrier coat.

17 Claims, No Drawings

ANAEROBICALLY CURABLE COMPOSITION

This invention relates to a sealant composition and to a method of sealing, in particular, pipeline leaks using such a composition.

The leakage of gas from gas pipelines is a serious economic and, particularly, environmental problem. The gas leaks through pores in pipeline joints and/or corrosion defects. It is not economic to cure leakage by making an excavation at each joint and applying sealant externally but, despite much effort, not truly effective and economic method has been found of sealing pipelines internally.

Hitherto, anaerobic sealants have been used in an endeavor to seal leaks. Anaerobically curing compositions comprise an anaerobic monomer, which is an ethylenically unsaturated compound which polymerises in the absence of oxygen and in the presence of a polymerization initiator and a ferrous or other suitable metal. As well as the monomer and the initiator, anaerobic compositions normally contain an agent to prevent polymerization of the composition when in storage. Anaerobically curing compositions based on acrylate or methacrylate systems are well known for sealing porosity in metals (GB 1297103 and GB 1547801). GB 1297103 and GB 1547801 describe compositions containing a major part of a monofunctional methacrylate ester (e.g. lauryl or butyl (methacrylate) and a minor part of a polyfunctional methacrylate ester (e.g. triethylene glycol dimethacrylate). The sealant of GB 1297103 comprises a peroxide initiator and is stabilised by aeration. The sealant of GB 1547801 comprises an inhibitor (e.g. hydroquinone) as well as a catalyst.

The compositions described in the two British patents are used in the vacuum impregnation of porous articles. Such anaerobically curing compositions, which are stable in the presence of oxygen (air), penetrate into pores and cracks where they cure in anaerobic conditions to form polymeric material permanently blocking the pores and sealing the cracks. The concept has been more recently extended for sealing leaking flexible pipeline joints by the use of inflatable balloon or bladder devices (EP 0164907) and by direct spraying of leaking joints in gas mains (Anaerobic Spraying—a New South Eastern Development, British Gas. Jan. 11, 1990). According to the latter method, leaking joints in gas pipelines are treated by internally spraying anaerobic sealant from a single excavation while the pipeline is carrying gas.

Anaerobic spraying of gas pipelines realises considerable savings in excavation, reinstatement and time when a number of locations require treatment. It is possible to treat up to 140 m of main from a single excavation in a fraction of the time taken using conventional external sealing techniques. The method results in a reduction in measured leakage but still leaves residual leakage from a pipeline.

In anaerobic spraying the anaerobic composition is normally applied to the joint by low pressure "wash" spray which avoids formation of droplets in the gas stream. A large portion of the sprayed material, however, washes down the wall of the pipe and remains in liquid uncured state for a period of from minutes to hours depending on the nature and conditions of the pipe and gas flow. Therefore, conventional anaerobic spraying is not as effective as would be desirable in sealing leaks in the upper portion of pipelines.

A representative anaerobic pipeline sealant comprises ethylhexyl methacrylate as the monomer, cumene hydroperoxide as the polymerisation initiator and p-methoxyphenol as an inhibitor to prevent premature polymerisation. In addition, the sealant normally contains hydroxypropyl methacrylate or another hydroxy functional (meth)acrylate ester.

Such a sealant formulation corresponds to the base preparation referred to hereinafter.

The present invention provides an anaerobically curable composition comprising an anaerobically curable monomer, a curing initiator, and fine particulate filler. In one embodiment the particles are closed, gas-containing particles. The gas may be air. In another embodiment the particles have an average particles density of less than 1 g/cm$^3$. Thus, the invention resides in an anaerobically curable preparation characterised by containing such fine particulate filler. The compositions will usually contain in addition an agent to prevent premature curing and/or a rheology modifier to render the composition pseudoplastic.

The invention includes an anaerobically curable composition, comprising:

i) an anaerobically curable monomer;
ii) a free radical catalyst;
iii) an agent to prevent premature curing;
iv) hollow inert particles preferable having one or more of the following properties:
   an average true particle density of from about 0.02 to 0.6 g/cm$^3$;
   a cross sectional dimension of from about 5–200 µm;
   a minimum % survival of 80 at a pressure of 500 psi (3.5 MPa) over ambient;
   a minimum volume % which floats in water of 90%;
   which hollow particles suitably do not promote premature curing of the composition and conveniently are in an amount of from 1–25% by weight of the composition; and
v) fumed silica coated with a trimethylsilane or a silicone oil, the coated, fumed silica preferably being in an amount of from 2–15% by weight of the total composition.

The inert particles are optionally glass particles or polymer microspheres or other particles having functionally equivalent properties to such glass or polymer particles. The coated fumed silica may be replaced by an alternative material which imparts substantially the same rheological properties and phase stability to the composition.

Also provided by the invention is a composition for use as a premix for making a catalysed anaerobic composition whose curing will be initiated upon being placed in an anaerobic environment, comprising an anaerobically curable base preparation and a fine particulate filler, the particles of which have an average density of less than 1 g/cm$^3$, the composition being substantially free of active curing initiator. The composition may be free of any curing initiator or it may contain an inactive curing initiator e.g. one part of a two part initiator. An exemplary two part initiator is a hydroperoxide catalyst and a metal promoter.

The invention further provides a method of sealing a wall, usually a pipeline wall, to control or prevent leakage through the wall, comprising applying to the wall a composition of the invention.

Additional aspects and embodiments of the invention are stated in the claims.

In one aspect, the invention comprises an anaerobic composition comprising a base preparation and a low density filler. The composition preferably contains in additional a rheology modifier.

The Base Preparation

The base preparation may in principle be any anaerobically curable preparation compatible with the low density filler and any rheology modifier to form an anaerobically curable composition. Such preparations are well known to those skilled in the art.

The base preparation normally comprises an ester of acrylic acid or an α-substituted acrylic acid, especially methacylic acid. A mixture of esters may of course be used.

The base preparation preferably contains a hydrocarbyl methacrylate and optionally a hydroxy functional methacrylate. Other monomers may optionally be included to modify the physical and/or chemical properties of the composition. Preferred hydrocarbyl methacrylates useful in the invention are of the formula:

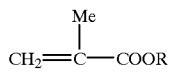

where R is a hydrocarbon group optionally containing at least 8 and often at least 9 carbon atoms and optionally at least one ether linkage. R is preferably an aliphatic (e.g. alkyl), aromatic and cycloaliphatic group or comprises one of these groups substituted by another thereof, in either case optionally containing at least one ether linkage. Preferably, the hydrocarbon group does not contain more than 14 carbon atoms.

More preferred R groups are alkyl groups, especially 8C–14C alkyl groups, which may be straight chain or branched, such as nonyl, decyl, isodecyl, lauryl or myristyl for example.

A suitable hydroxyfunctional methacrylate is hydroxypropyl or hydroxyethyl methacrylate, or another hydroxyalkyl methacrylate. Any hydroxyfunctional methacrylate is preferably wholly or predominantly a monohydroxy compound. Exemplary base preparations contain from 30 to 95% by weight or hydrocarbyl methacrylate and from 5 to 70% by weight of hydroxy functional methacrylate, the percentage total of all the constituents adding up to 100. In a preferred class of embodiments the hydrocarbyl methacrylate:hydroxyfunctional methacrylate weight ratio is 1.25:1 to 0.75:1, e.g. about 1:1.

Among the other optional monomers which may be included in the base preparation are polyalkylene glycol monomethacrylates, e.g. polypropylene glycol monomethacrylate, which suitably contains an average of 5 propylene residues per molecule and is commonly used as a softener. The content of such other optional monomers is typically no more than 25% of the base preparation.

The constituents of the base preparation are not critical to the invention and, in principle, any anaerobically curably preparation may be used. However, the base preparation must be suitable for the intended use of the anaerobic composition. In the case of compositions to be pumped through a tube to the site of application it is preferable that the base preparation be of low viscosity, to facilitate pumping of the composition. Accordingly, the skilled person will select monomer(s) which provide low viscosity, suitable monomers being well known to those familiar with anaerobic sealant technology. It is preferred that the base preparation have a viscosity at 20° C. not exceeding about 100 cps, more preferably not exceeding about 20 cps. Exemplary preparations have a viscosity of no more than about 15 cps, e.g. about 10 cps. Low viscosity may be obtained, as known, by using relatively low weight monomer, e.g. the preferred hydrocarbyl and hydroxyfunctional esters described above. Oligomeric methacrylate is undesirable.

The base preparations when ready for use normally contain a free radical catalyst as curing initiator e.g. cumene hydroperoxide, diisopropylbenzene monohydroperoxide or another hydroperoxide or peroxide. The catalyst promotes anaerobic polymerisation when the composition has penetrated a pore or fissure, for example. Metal on the surface of the pipeline wall will promote hydroperoxide catalysts to decompose and release free radicals to initiate polymerisation.

The base preparation may contain a redox initiator system comprising a combination of ingredients which produce an oxidation-reduction reaction resulting in the production of free radicals. Typically, such an initiator system comprises a peroxy compound and a tertiary amine or sulphimide or a hydroperoxide and a metal compound. The second component promotes decomposition of the peroxy or hydroperoxy compound. Activated peroxides may also be used with metal promoters. Suitable peroxy and hydroperoxy compounds are benzoyl peroxide and cumene hydroperoxide. Suitable decomposition promoters are tributyl amine, dimethylparatoluidine, benzoic sulphimide, copper octanoate or copper saccharin salt. Benzoyl peroxide/dimethylparatoluidine initiator systems are preferred.

The base preparations also normally contain an agent to prevent premature curing, e.g. curing during storage. The curing prevention agent is not critical to the invention and may be hydroquinone or p-methoxyphenol, for example. If there is no curing prevention agent, the initiator or a component thereof is suitably added to the anaerobically curable composition immediately before use. Additionally or alternatively to an inhibitor, a metal chelator may be used as a stabiliser.

If the low density filler contains metal capable of activating the catalyst, it will be essential to include a metal chelator to make a storage-stable composition. Suitable chelators are described in U.S. Pat. No. 4,426,921 and may be any compound capable of forming coordination compounds with metal ions and compatible with the anaerobically curable composition.

One class of chelating agents comprises those wherein all the ligand atoms are nitrogen. Typical examples of chelating agents in this case are dipyridyl, tripyridyl, phenanthroline, 1,2-bis(2'-pryridyl-methyleneamino)ethane.

Another class of chelating agents comprises those which possess a combination of oxygen and nitrogen ligand atoms, such as characterizes the α- and β-aminocarboxylates. Examples include the soluble carboxylated polyamines, such as the sodium derivatives of polycarboxylated alkylenediamines, e.g. tetra-sodium ethylenediamine tetraacetic acid. Other chelating agents of this type are o-aminophenol and 8-hydroxyquinoline.

Another suitable chelator is diphosphonic acid.

The proportion of the metal ion chelator in the base preparation is suitably 1 to 1000 ppm by weight of the base preparation, preferably 10 to 500 ppm.

The anaerobically polymerisable base preparation may contain other optional ingredients in small quantities, for example other reactive monomers or oligomers, such as diallyl phthalate, or maleate or fumerate esters, for example.

The Low Density Filler

The low density filler comprises fine particles of low density, by which is meant closed gas-containing particles (e.g. hollow gas filled particles or particulate closed cell foam) or particles having an average particle density of less than 1 g/cm$^3$, preferably of less than 0.9 g/cm$^3$ and most preferably of no more than about 0.8 g/cm$^3$. More usually, the particles have a density of no more than about 0.6 g/cm$^3$. The minimum density of the filler particles is not critical but typically amounts to a density of about 0.1 g/cm$^3$. Preferably, at least 90% by volume of the filler particles will float in water.

The filler functions to reduce the density of the anaerobic composition and modify its flow properties. In particular, it is effective to reduce slumping of the composition under its own weight. The quantity of filler used depends upon the properties desired of the anaerobic composition. The inventor has found that useful compositions can be made using the filler in an amount of from 1–20% by weight of the total composition. More preferably the filler is an amount of from 10–15 wt % for glass spheres. A content of about 1–5 wt % has been found very suitable for elastomeric spheres. If the filler absorbs organic compounds, it must not be used in an amount which absorbs substantially all the base preparation.

The filler particles are fine particles which can be suspended in the anaerobic composition and entrained with the composition when it flows. The particle size is not critical and will be selected to achieve the desired properties of the anaerobic composition. A cross-sectional dimension of from 30–200 um, more preferably 60–180 µm, has been found suitable.

The filler is chosen to be compatible with the anaerobic composition. In particular, it must not cause premature polymerisation of the composition. Filler with excessive metal ions available to the surface is to be avoided.

The filler functions to alter the properties of the base preparation during use of the preparation. The filler must therefore retain its low density and its inertness as a curing initiator until the anaerobic composition reaches its site of application.

The filler may comprise hollow particles or spheres. In one class of embodiments the filler comprises hollow glass spheres. A suitable glass is sodalime borosilicate glass. If hollow particles are chosen as the filler, they must substantially resist rupturing during normal processing of the anaerobic composition. In cases when the composition is used as a pipeline sealant, the composition may conveniently be pumped along the pipeline. Such pumping subjects the pumped liquid to pressures significantly above ambient. It is thus desirable that hollow particles used in pipeline sealant substantially resist rupturing (e.g. minimum % survival of at least 80) at pressures of up to 300 psi (2 MPa) and preferably the hollow spheres should resist rupturing at pressures up to 1000 psi.

One class of suitable glass spheres have an average true particle density of from about 0.1 to 0.6±0.03 $g/cm^3$ as determined by the method of ASTM D2840 (1984 edition) and a size from about 70 to 180 µm (test method ASTM D1214, 10 g glass spheres: max weight percentage retained 5%); the glass spheres preferably have a minimum % survival of 80 at a test pressure of 300 psi (2 MPa) and more preferably a minimum % survival of 80 at a test pressure of 500 psi (3.5 MPa), % survival suitably being determined in accordance with 3 M Test Method TM-2028. In this test method % survival is calculated from the change in density of a sample (mixed with talc) after exposure to dry nitrogen. Such glass spheres are available from 3 M United Kingdom plc, 3 M House, P.O. Box 1, Bracknell, Berkshire, RG12 1JU, United Kingdom under the trade mark "Scotchlite® Glass Bubbles".

Fillers containing metal which would cause premature polymerisation must be treated to reduce to an acceptable level the metal ion concentration available to the base preparation. The treatment may comprise washing, application of a barrier coating or both. Thus, glass spheres may be washed by agitation in strong inorganic acid (e.g. 2 M HCl), washed in a chelator (e.g. aqueous phosphonic acid) and finally rinsed in distilled water before being dried. Additionally or alternatively the filler may be coated with silicone oil or another substantially metal-free barrier.

Another class of suitable filler comprises hollow thermoplastic microspheres of density 0.02 to 0.08 $g/cm^3$ and size between 10 to 40 µm. The type of microspheres based on thermoplastic polymers are highly resistant to rupture when compounded into an anaerobic sealing composition because of their flexible and resilient nature. As an example of an organic filler the plastic microsphere known as EXPANCEL DE may be mentioned. EXPANCEL DE is sold by Boud Marketing Limited.

The Rheology Modifier

The rheology modifier helps to increase the rheological yield value of the anaerobic composition, i.e. to cause the composition to flow only when a high shear stress is applied. The viscosity of the flowing composition is not increased to the same extent, i.e. the rheology modifier renders the composition pseudoplastic.

Pseudoplastic flow behaviour is characterised by a viscosity decrease with an accelerated shear rate or increased shear stress. "Thixotropy" is a term which is properly used to describe a non Newtonian flow behaviour that has a time dependent decrease in viscosity with increasing shear stress and shear rate.

The so-called "thixotropic index" of a substance is in fact a viscosity ratio, defined herein as the ratio of viscosity when measured at a speed of 20 rpm to the viscosity when measured at 2.5 rpm (by a Brookfield viscometer). The index is a measure of pseudoplastic behaviour.

The rheology modifier may function to make the composition thixotropic, although this is not necessary.

The rheology modifier preferably acts also a phase stabiliser, that is it helps prevent separation of the filler particles from the liquid phase and maintain a uniform blend. The rheology modifier must be compatible with the other components of the composition.

A preferred rheology modifier is fumed silica coated with trimethylsilane. The trimethylsilane coated silica may be prepared, for example, by treating fumed silica with a methylchlorosilane, such as 3 dimethyl dichlorosilane or timethyl chlorosilane, or more preferably with hexamethyldisilazine.

A preferred type of hexamethyldisilazine treated fumed silica is Aerosil R812 (TM of Degussa Limited) which is a hydrophobic silica having a BET surface area of 260±30 $m^2/gm$ and an ignition loss (2 hours at 1000 degrees ° C.) of 1–2.5%.

Another preferred filler is fumed silica treated with silicone oil, which is available from Degussa Limited under the trade mark Aerosil R202.

In one class of embodiments the filler has a specific surface area of at least 140 $m^2/g$, e.g. of at least 200 $m^2/g$, and optionally of at least 250 $m^2/g$ when measured by the method of DIN 66131.

Alternatively, there may be used wax-based rheology modifiers. Suitable wax modifiers include low molecular weight such as polyethylene glycol wax with a melting point of about 60° C. or low melting point (e.g. less than 100° C.) stearic acid esters. Suitable commercial preparations are those sold under the trade marks THIXOMEN and THIXOTROL ST.

The rheology modifier is incorporated in the composition in an amount suitable to impart the desired rheological properties to the composition. In one class of embodiments the rheology modifier is included in an amount of up to 15% by weight of the total composition and more preferably in an amount not exceeding 10 wt %. Fumed silica coated with timethylsilane or silicone oil is preferably used in an amount of no more than about 10% by weight of the total composition and more preferably in an amount of no more than about 8%, e.g. from 0.5–8 wt %.

The Composition

The filled, rheologically modified, anaerobically curable compositions of the invention have a reduced density compared to conventional anaerobic sealant by virtue of the low density filler. The rheological properties are also altered by the rheology modifier. In the result, the composition behaves like a paste or gel until a relatively high shear stress is applied and resists flowing under its own weight.

Preferred compositions have a thixotropic index of at least 4, e.g. about 5.

Preferred rheologically modified compositions will not move on a vertical glass plate when in the form of a bead having a height of from 3 to 8 mm or preferably more, e.g. 12 mm. Preferably the rheologically modified compositions have a viscosity at 20° C. of at least 2000 cps, e.g. 2000–5000 cps, when measured at a shear rate of $10\ s^{-1}$.

The polymer of the cured composition preferably has a low glass transition point of –5° C. or below, so that the polymer does not pass through the glass transition point in ordinary use.

The Use of the Composition

The anaerobic composition is useful for sealing defects in a wall to control or prevent leakage through the wall, by applying the composition thereto. The properties of the composition make it particularly suitable for application to non-horizontal or downward facing wall surfaces, because its low density and, in preferred embodiments, pseudoplastic behaviour help the composition resist flowing or slumping under its own weight.

The composition finds particular utility in sealing pipelines, especially fuel gas pipelines. The invention also contemplates the use of the composition to seal water pipelines. Extensive gas loss occurs from iron pipelines, through corrosion defects and imperfections in the joints. The inventive composition is applied to the internal wall of the pipeline in a region containing porosity and/or crack defects. Liquid, possibly containing entrained particles, enters pores or cracks in the pipeline (whether at joints or in a pipe section) where it cures rapidly in the anaerobic conditions obtaining in the pores or cracks. The composition is preferably applied to form a layer of from 0.2 to 10 mm thick, where it cures and forms an impervious polymer lining firmly adhered to the pipe wall.

The invention is not limited as to the manner of application of the composition to the wall to be treated. Pipeline sections of lengths of up to 140 m may be treated from a single excavation by pumping the composition through a hose at low pressures of up to 1000 psi to an applicator head (using for example a positive displacement pump). An alternative pump type capable of applying greater pressures may be used to pump the composition through longer lengths of hose if the low density filler is capable of withstanding such higher pressures. In practice gear pumps are to be avoided because they may damage the filler particles.

An anaerobic composition containing both a free radical catalyst and a catalyst decomposition promoter will have a short shelf life. It is therefore preferable to use the composition in two-part form by making a premix composition substantially free of catalyst or decomposition promoter (or both) and to add the omitted component(s) shortly before use. A convenient technique is to make a premix to which copper is to be added as promoter and then to pump the premix to the application site through tubing in a region of which there is copper, e.g. a section of copper pipe. The copper may suitably be replaced by an alternative metal.

Suitable applicator apparatus is described in GB 2226865. The apparatus described therein comprises a spray carriage movable in the interior of a pipeline. A spray head, located centrally within the pipeline, is mounted on the carriage and is fed with the sealant in a circumferential pattern. Such spray carriages are well known in the art. The spray head may be a conventional head or a spinning cup head, for example.

As an alternative to spraying, a layer of sealant may be applied by a "pig", i.e. a somewhat plunger-like device between whose periphery and the pipeline wall a layer of sealant is laid down. Such devices are familiar to those skilled in the art. Exemplary devices are described in GB 2140530, GB 2133497, US 4582551 and GB 2131910.

EXAMPLES

Example 1

Preparation of Hollow Glass Spheres

Hollow glass spheres [Scotchlite® Glass Bubbles B23/500, having a particle density of $0.23\ g/cm^3$ and a minimum % survival of 80 at a test pressure of 500 psi (3.5 MPa)] were washed by vigorously shaking equal volumes in a separation funnel with 2 molar HCl. The mixture was allowed to stand for a period before removing the aqueous layer. This procedure was repeated 3 times followed by 2 washes of 0.1 molar diphosphonic acid followed by 3 distilled water washes. The slurry was oven dried before use.

Example 2

Preparation of Anaerobic Composition

A base preparation was made comprising:

| Constituent | Parts by Weight |
| --- | --- |
| Lauryl methacrylate | 40 |
| Hydroxypropyl methacrylate | 40 |
| Cumene hydroperoxide | 1 |
| Saccharin | 1 |
| Polypropyleneglycol monomethacrylate | 15 |
| Dimethyl paratoluidine | 0.5 |
| Stabiliser and other additives | 1 |

The base preparation had a viscosity of 10 cps and was blended with the treated glass spheres from Example 1 and with silicone oil-coated fumed silica (Aeorsil R202) as follows:

| | Parts by Weight |
| --- | --- |
| Base preparation | 80 |
| Coated fumed silica | 5 |
| Treated glass spheres | 15 |

The resultant composition had a viscosity of 15,000 cps (Brookfield T, Spindle A, 20° C., 20 rpm). A bead 0.8 mm high did not slump on the vertical surface.

When polymerized by the addition of small quantities of copper salts the polymer had a density of about $0.6\ g/cm^3$ and a Shore "A" hardness of 85–90.

Polymers of lower modules can be prepared from compositions which yield polymers of lower glass transition temperature.

Example 3

A base composition was made comprising:

| Constituent | Parts by Weight |
| --- | --- |
| Hydroxypropyl methacrylate | 20 |
| Polypropyleneglycol monomethacrylate | 35 |
| Hyrdocarbyl methacrylate | 31.5 |
| Urethane methacrylate | 5 |
| Polymerisable surfactant | 5 |
| Saccharin | 1 |
| Cumene hyrdoperoxide | 1 |
| Dimethyl paratoluidene | 0.5 |
| Stabilisers | 1 |

The base preparation had a viscosity of 20 cps and was blended and treated with the following compositions:

| Constituent | Parts by Weight |
| --- | --- |
| Glass spheres (BHL lightweight glass microspheres, grade 23, Boud Marketing Limited) | 5.0 |
| Expanded micro-spheres (Expancel 091-DE 80, Boud Marketing Limited) | 1.5 |
| Coated fumed silica (Aerosil R202) | 4.0 |
| Coated fumed silica (Aerosil R812) | 1.2 |

The resultant composition had a viscosity of 6000 cps (Brookfield T, Spindle A, 20° C., 20 rpm) and a viscosity of 30,000 cps (Brookfield T, Spindle A, 20° C., 25 rpm).

What is claimed is:

1. An anaerobically curable composition for use in sealing gas pipeline leaks, said composition comprising an anaerobically curable base preparation and a filler, wherein said filler is a metal-containing filler provided with a substantially metal-free barrier coating, said base preparation having a viscosity not exceeding about 20 cps measured at 20° C. and including an ester selected from the group consisting of:
   (i) hydrocarbyl esters of acrylic or methacrylic acid, the hydrocarbyl moiety containing from about 9 to about 14 carbon atoms; and
   (ii) hydroxyfunctional esters of acrylic or methacrylic acid.

2. A composition as claimed in claim 1 wherein said filler is comprised of particles having a cross-sectional dimension of 5–200 microns.

3. A composition as claimed in claim 2 characterized in that said particles have an average density of less than 1 g/cm$^3$.

4. A composition as claimed in claim 2 further including a rheology modifier for providing said composition to possess a pseudoplastic character and to resist phase separation of said composition.

5. A composition as claimed in claim 2 further including a rheology modifier for providing said composition to possess a pseudoplastic character, and wherein a bead thereof having a height of 3 to 12 mm does not move on a vertical face of glass plate.

6. A composition as defined in claim 5 wherein said rheology modifier comprises an amount of up to 15% by weight of the total composition; said rheology modifier means comprises fumed silica having a coating thereon of trimethylsilane or silicone oil wherein said fumed silica and coating comprises an amount of up to 8% by weight of the total composition.

7. A composition as claimed in claim 1 characterized in that said base preparation has a viscosity not exceeding 15 cps.

8. A composition as claimed in claim 2 for use as a premix for making a catalysed anaerobic composition which will begin to cure when placed in an anaerobic environment, said composition being substantially free of active curing initiator.

9. A composition as defined in claim 8 wherein said particles have an average density of less than 1 gram/cm$^3$.

10. An anaerobically curable composition as claimed in claim 1 substantially free of active curing initiator, wherein said filler is comprised of fine, closed, gas-containing particles having a cross-sectional dimension of 5–200 microns.

11. A composition as defined in claim 10 wherein at least 90% by volume of said particles float in water.

12. A composition as claimed in claim 10 wherein said particles are hollow particles of particulate closed cell foam.

13. A composition as defined in claim 2 wherein said particles are organic particles.

14. A composition as defined in claim 13 wherein said particles have an average density of less than 1 gram/cm$^3$.

15. A composition as defined in claim 14 wherein said composition includes a free radical catalyst, a promoter for said catalyst and an agent to prevent premature curing.

16. A composition as defined in claim 14 wherein said particles have an average density of no more than 0.8 g/cm$^3$.

17. A composition as defined in claim 16 wherein said particles have an average density of at least 0.02 g/cm$^3$.

* * * * *